United States Patent [19]

Sugiura et al.

[11] Patent Number: 5,019,773
[45] Date of Patent: May 28, 1991

[54] METHOD AND APPARATUS FOR DETECTING POSITIONS AND/OR SPEED OF A MOVING BODY USING TWO PHASE SIGNALS

[75] Inventors: Yasuyuki Sugiura, Takahagi; Rika Oue, Mito; Kunio Miyashita; Hiroshi Nagase, both of Hitachi; Nobuyoshi Mutoh, Katsuta; Sumio Kobayashi, Chiba; Hiroshi Sugai, Sakura, all of Japan

[73] Assignee: Hitachi, Ltd., Tokyo, Japan

[21] Appl. No.: 397,130

[22] Filed: Aug. 22, 1989

[30] Foreign Application Priority Data

Aug. 24, 1988 [JP] Japan ................... 63-208399

[51] Int. Cl.$^5$ .................. G01P 3/489; G01P 3/48; G01B 7/30; H02P 7/00
[52] U.S. Cl. .................. 324/166; 324/207.25; 364/565
[58] Field of Search ............... 324/160, 161, 163–166, 324/208, 207.25; 364/565; 361/236, 239, 240; 318/721, 799

[56] References Cited

U.S. PATENT DOCUMENTS 4,560,927 12/1985 Ishida et al. .................. 324/161 X
4,680,721 7/1987 Pluddemann .................. 364/565
4,808,933 2/1989 Kobayashi et al. ............. 324/166 X
4,839,834 6/1989 Omae et al. .................... 324/166 X
4,847,555 7/1989 Stammer et al. ............... 324/166 X

FOREIGN PATENT DOCUMENTS 0145935 6/1985 European Pat. Off. .
0162268 11/1985 European Pat. Off. .

Primary Examiner—Gerard R. Strecker
Attorney, Agent, or Firm—Antonelli, Terry, Stout & Kraus

[57] ABSTRACT

Sine wave signals generated from a position detector are used as analog values to detect a fine position of a rotating or moving body, a rise or fall edge of the sine wave signal is used to detect a coarse position of the rotating or moving body, and the position or speed of the rotating or moving body is detected based on a signal indicative of the detected coarse position when the rotating or moving body is at high speed and based on a signal indicative of the detected fine position when the rotating or moving body is at low speed to thereby provide optimal control from high speed to low speed. Especially at extremely low driving, speed detection with superhigh resolution is effected using the analog value to decrease an uneven rotation of the rotating body.

7 Claims, 13 Drawing Sheets

F I G. 10
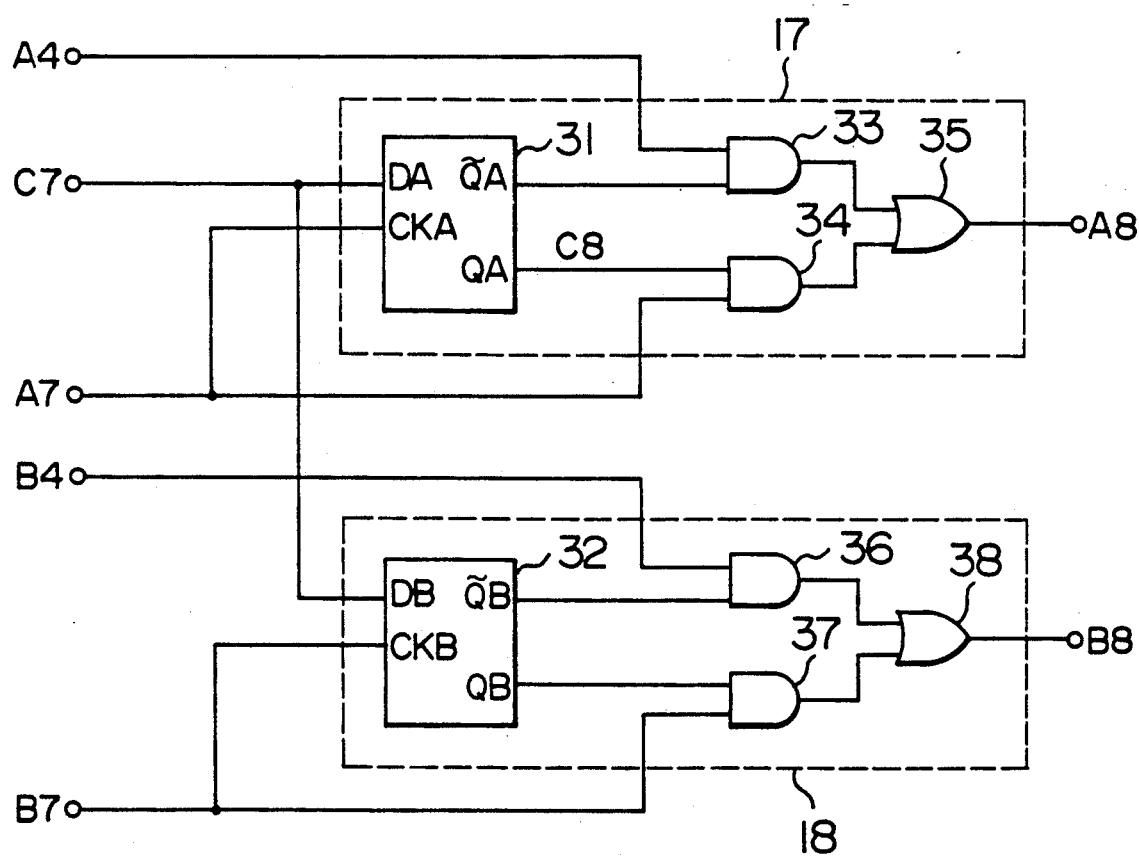

METHOD AND APPARATUS FOR DETECTING POSITIONS AND/OR SPEED OF A MOVING BODY USING TWO PHASE SIGNALS

BACKGROUND OF THE INVENTION

1. Field of the Invention

The present invention relates to apparatus and method for detecting the position and/or speed of a rotating body (a rotating object) or a moving body (a moving object). The present invention also relates to systems which transmit to a controller an output signal from a sinusoidal wave encoder as a position detector.

2. Description of the Prior Art

An encoder is known which detects the rotational angle of a rotating body or the position of a moving body magnetically or optically. The encoder changes the signal from the rotating body or the moving body to a pulse signal and counts rise or fall edges of the signal to detect the position of the rotating body or moving body.

The apparatus disclosed in a Japanese application Laid-Open JP-A-61-81185 by H. Tamura et al changes encoder signals to pulse signals, and counts the pulse signals to obtain the speed or position of a rotating body or a moving body. The apparatus includes a high-resolution encoder used at low speed and a lower-resolution encoder used at higher speed.

Data on the actual speed is obtained by counting pulses produced for a predetermined sample time or a predetermined number of (two or more) inter-pulse time intervals.

A specific speed detection process will now be described with reference to FIG. 4 in which reference character P denotes a train of pulses obtained from the encoder, and Ts is a sample time which is about 0.5 msec in the particular example. A high accuracy value indicative of the detected speed is obtained by detecting the number of pulses $P_n$ produced for a sample time $T_s$, and the interval $T_d$ between the pulses $P_n$, and performing the following division:

$$N = K_1 \frac{P_n}{T_d} \tag{1}$$

When the rotating body or moving body falls in a low or extremely low speed region, no pulses $P_n$ are produced in a predetermined sample time to thereby render the detection of the speed uncertain.

This process is hereinafter referred to as a pulse detecting system. According to this system, it it impossible to detect a position falling between adjacent pulses even if the number of pulses per rotation and resolution are increased using excellent manufacturing techniques.

For example, a direct drive motor which drives a load using no gears can rotate at an extremely low speed lower than one rotation per minute. According to the pulse detection system, there are no plurality of pulses in a sample time, or there are only a very few pulses, if any, and therefore, stabilized speed control cannot be expected. It is obvious that the use of long sample time increases the number of pulses to be detected in the sample time to thereby enable stabilized control, of course. However, the responsiveness to control is lowered.

The original signal from the encoder generally takes the form of a sine wave signal or a signal similar thereto. In a sine wave signal detection system which uses the analog value of the original signal as it is as a position signal, a superhigh resolution of more than a million pulse per rotation is obtained to thereby enable substantially stepless position detection and to bring about a shortened sample time and rapid control.

On the other hand, since the analog signal is used, the encoder and the controller cannot be connected in an isolated manner through a photocoupler for a signal transmission. Therefore, the controller is likely to be influenced by noise to thereby render it impossible to provide a long transmission distance.

SUMMARY OF THE INVENTION

It is an object of the present invention to realize an extremely low speed rotation or movement of a rotating or a moving body (object) without pulsation, to improve frequency response characteristics to provide rapid control of the rotating body or the moving body, to insulate the transmission path between the encoder and the controller for transmitting purposes, to increase the resistance of the controller to noise, or to increase the length of the signal transmission path.

According to one aspect of the present invention, a sine or sinusoidal wave signal from a position detector is used as an analog value to finely detect a position (a finely detected position), and a rise or fall edge of the sine wave signal is used to coarsely detect a position (a coarsely detected position). The position or speed of the rotating or moving body (object) is detected using the coarse position signal at high speed and the fine position signal at lower speed.

More specifically, the present invention provides a method of detecting the position or speed, using a position or speed detecting apparatus including a position detector for outputting two analog signals out of phase, means for outputting a signal indicative of the detected fine position from the analog values of the analog signals, and means for converting the analog values to a pulse signal as a signal indicative of the detected coarse position, comprising the steps of:

detecting the position or speed of a moving body using the signal indicative of the detected coarse position when the moving body is at high speed; and detecting the position or speed of the moving body using the signal indicative of the detected fine position when the moving body is at low speed.

The specific structure of a position detecting apparatus for realizing this method comprises:

a position detector for outputting analog signals such as sine waves or triangular waves out of phase depending on the movement of a rotating or moving body;

a pair of PWM pulse forming circuits for performing pulse width modulation on those analog signals from the position detector;

a pair of analog converters for converting the PWM pulse signals to analog signals;

a pair of pulse shaping circuits for shaping the analog signals to square pulse signals;

a coarse position detector for detecting a coarse position of the moving or rotating body from the edges of the pulse signals outputted from the pulse shaping circuits; and a fine position detector for detecting a fine position of the rotating or moving body from the analog values of the analog signals.

In addition, a pair of photocouplers is disposed in the transmission paths connecting the corresponding PWM pulse forming circuits and the controller side to transmit an electrical signal therethrough in an electrically isolated manner to thereby improve resistance to noise.

This arrangement provides optimal control from high speed to extremely low speed at which speed detection is effected with superhigh resolution using analog values, so that uneven rotation is prevented. The transmission through the photocoupler serves to shut off noise from the position detector (encoder) to thereby prevent the malfunction of the controller.

BRIEF DESCRIPTION OF THE DRAWINGS

FIG. 10 shows a switching circuit to prevent hazards.

DESCRIPTION OF THE PREFERRED EMBODIMENT

Figure 5:
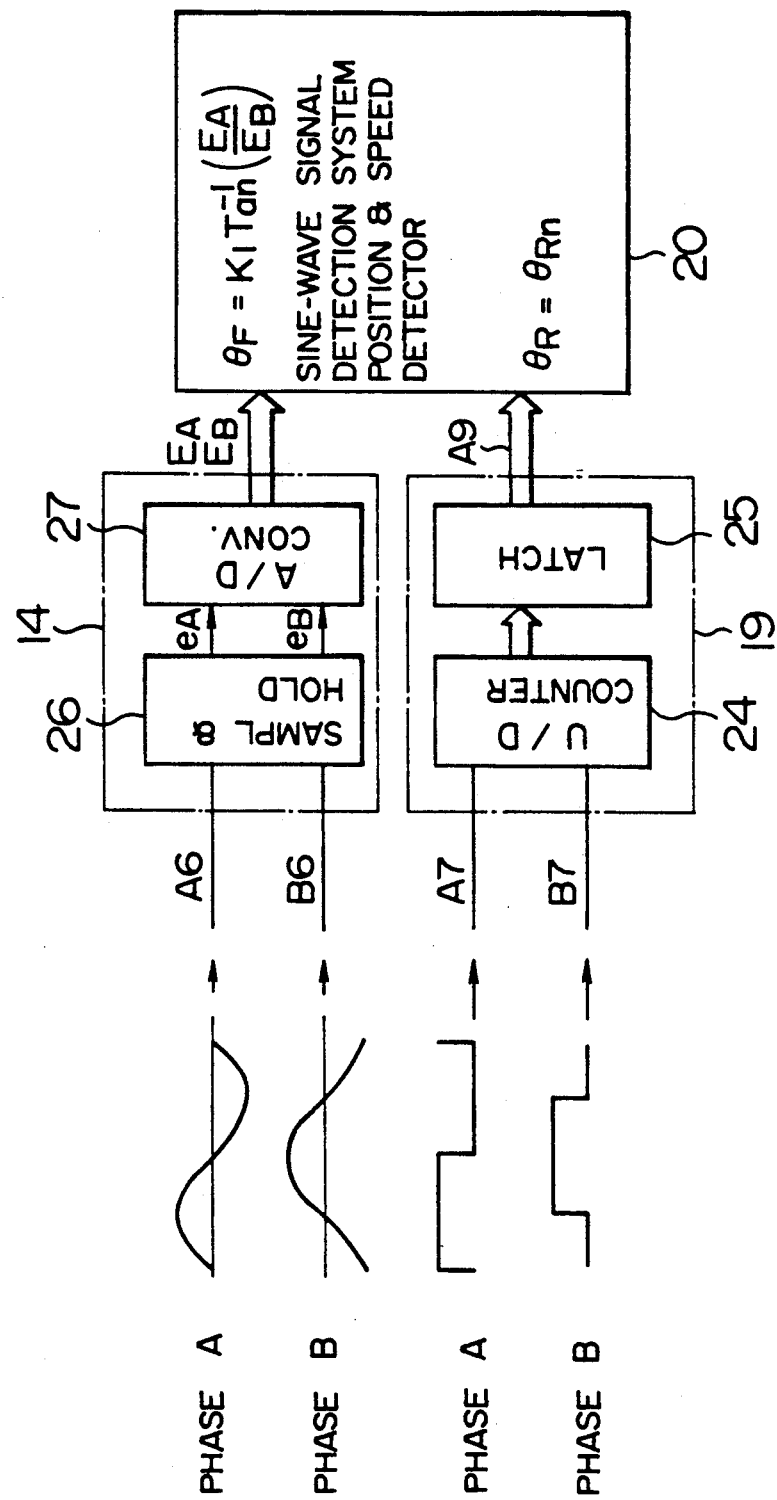
FIG. 5 is a block diagram of a sine wave signal detection system.
Figure 6:
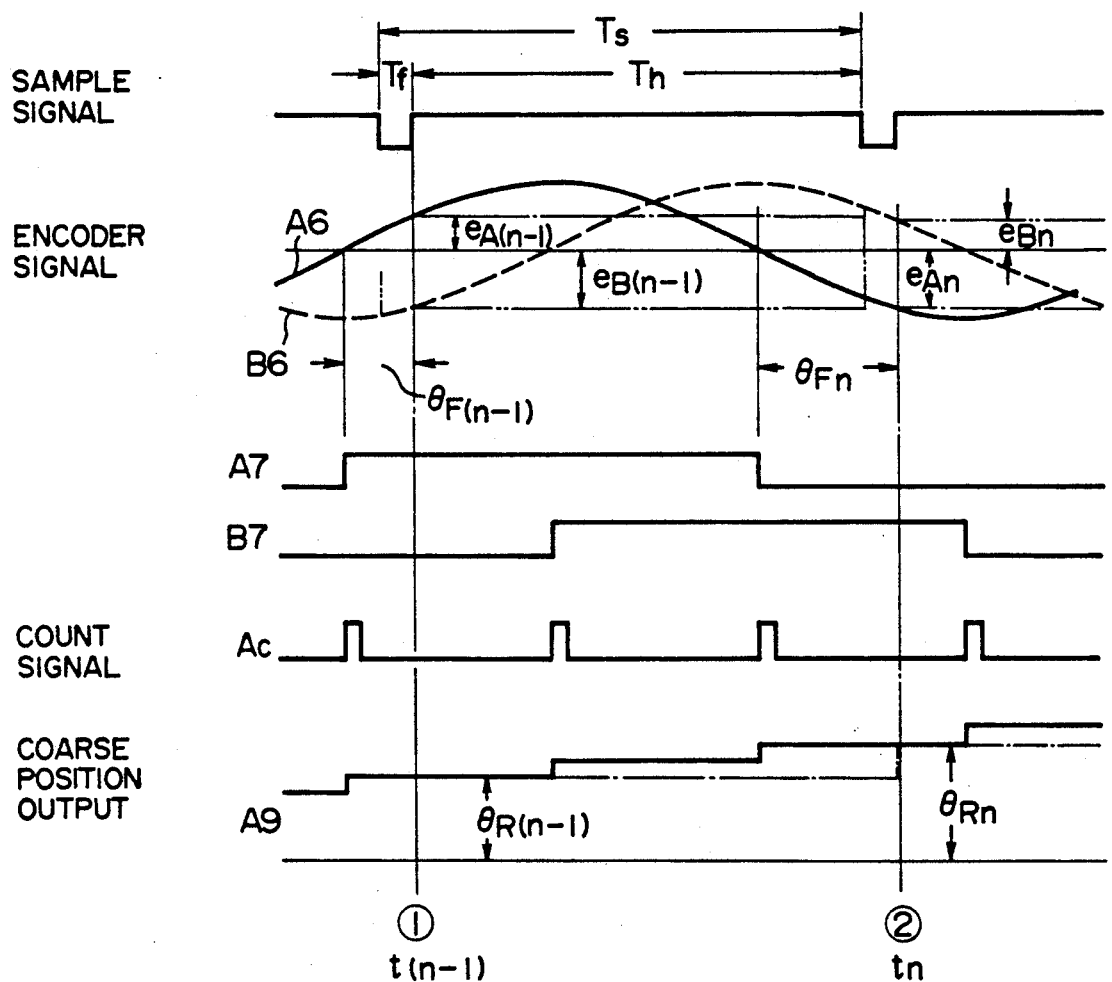
FIG. 6 is a timing chart in the use of the sine wave signal detection system.

A specific embodiment of the present invention will now be described with reference to the drawings. First, a sine wave signal detection system will be outlined with reference to FIGS. 5 and 6. A speed detector is a sine wave encoder. This is referred to as a sine wave signal detection system. Position detection is effected by using a coarse position detecting circuit 19 and a fine position detection circuit 14. In the detection of a coarse position, reproduced sine wave output A6 and B6 are shaped to pulses A7 and B7, which are converted to count signals $A_c$ at rise and fall edges (zero-crossing points) of each of the signals A7 and B7 and the count signals are detected by an up/down (U/D) counter 24. The detection of the coarse position is effected by using the count in the U/D counter 24 latched in a latch circuit 25 at sample times of $T_s$. For example, a value on a coarse position $\theta_{R(n-1)}$ latched at a time $t_{(n-1)}$ or a point 1 in FIG. 6 is held to the next sample point 2 or a time $T_n$. The coarse position value $\theta_{Rn}$ is latched at a time $T_n$ or point 2.

The value $\theta_F$ of the fine position detection 14 will be detected as follows. The reproduced sine wave signals A6 and B6 in A- and B-phases are, respectively, held at the sample point 1 by a sample and hold circuit 26 to provide analog values $e_{A(n-1)}$ and $e_{B(n-1)}$. These values are converted by a A/D converter 27 to digital values $E_{A(n-1)}$ and $E_{B(n-1)}$. A value $\theta_F$ is calculated by a position and speed measuring circuit 20 as follows:

$$\theta_{F(n-1)} = K_1 \tan^{-1}(E_{A(n-1)}/E_{B(n-1)}) \quad (2)$$

The calculation of the equation (2) may be performed by software in a microcomputer, for example. The microcomputer calculates the following equation (3):

$$E_{A(n-1)}/E_{B(n-1)} \quad (3)$$

On the other hand, data on tan $\theta_F$ is stored beforehand in a table in ROM. The fine position is detected by using an address $\theta_{F(n-1)}$ in the ROM where the value of the equation (3) coincides with data on tan $\theta_F$. The number of data segments on tan $\theta_F$ at that time is the divisor between adjacent count signals $A_c$ and represents the resolution on the position. A position $\theta$ is calculated from a coarse position $\theta_R$ and a fine position $\theta_F$ as follows:

$$\theta = \theta_R + \theta_F \quad (4)$$

If the fine position $\theta_F$ is represented with 8 bits and the coarse position $\theta_R$ is represented with the subsequent bits, data on the coarse and fine positions constitutes a series of data. Since the position is detected at constant sample intervals, the speed $\omega$ is detected as the differential between the positions:

$$\omega = d\theta/dt = C(n - th \text{ position data } \theta_n - \quad (5)$$
$$(n - 1)th \text{ position } \theta_{(n-1)})$$

Figure 1:
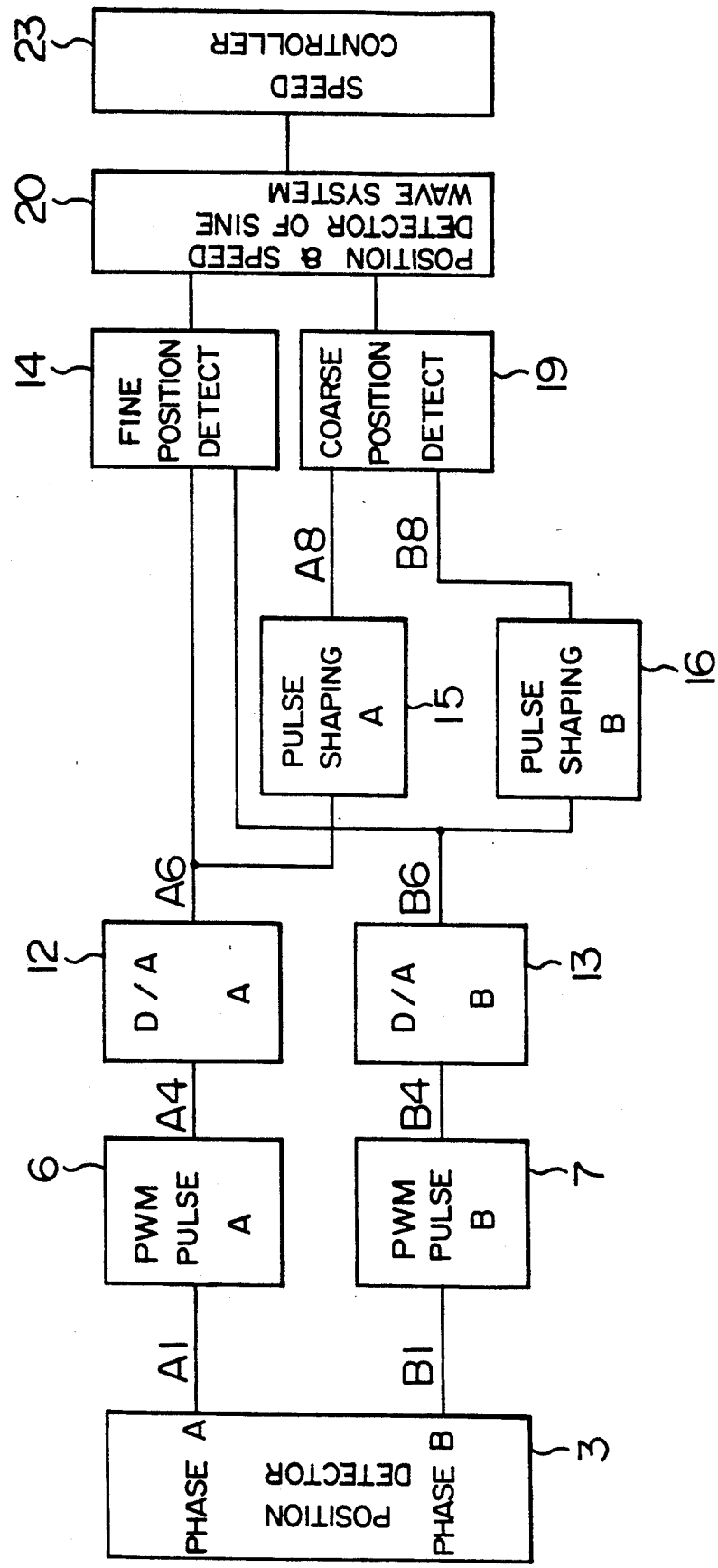
FIG. 1 shows a position and speed detector according to one embodiment of the present invention.
Figure 7:
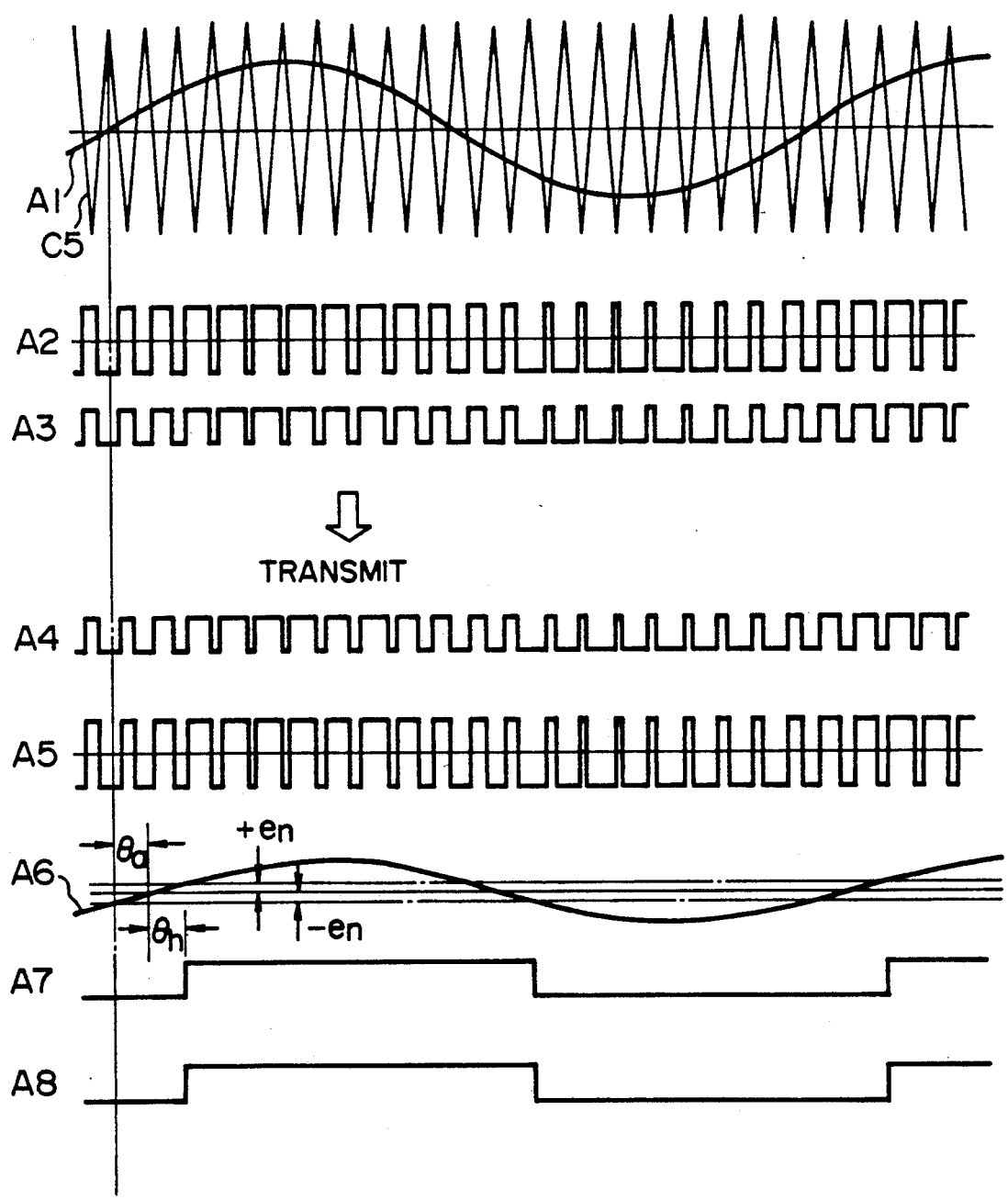
FIG. 7 is a timing chart in the use of PWM transmission at low speed.

A specific circuit diagram and a control system and method according to the present invention will now be described with reference to the drawings. First, one embodiment for detection of a position according to the present invention will now be described with reference to the drawings concerned. FIG. 1 is a circuit diagram of one embodiment according to the present invention. FIG. 7 is a timing chart for the embodiment, but a timing chart for B-phase is omitted. Reference numeral 3 denotes a position detector which generates sine wave or triangular wave analog signals A and B 90° out of phase and corresponding to the speed of a rotating or moving body (not shown); 6 and 7, pulse width modulation pulse generators which compare a corresponding analog output and a triangular or saw-tooth wave to output pulse outputs indicated by A4 and B4, respectively; 12 and 13, analog converters which convert PWM outputs A4 and B4 to corresponding analog sine wave or triangular wave signals indicated by A6 and B6, respectively; and 15 and 16, pulse shaping circuits which form square pulses from the reproduced analog outputs A6 and B6 indicated by A8 and B8, respectively; 19, a coarse position detector which counts edges of the outputs A8 and B8 from the pulse shaping circuits 15 and 16 using a U/D counter; 14, a fine position detector which divides by n an inter-coarse position pulse interval from the reproduced analog outputs A6 and B6; 20, a position and speed detector of a sine wave signal detection system and including a microcomputer which calculates the equations (2)-(5); and 23, a speed controller which calculates the error between a speed command (not shown) and the calculated speed and performs a proportional and integral operation on the error.

Figure 2:
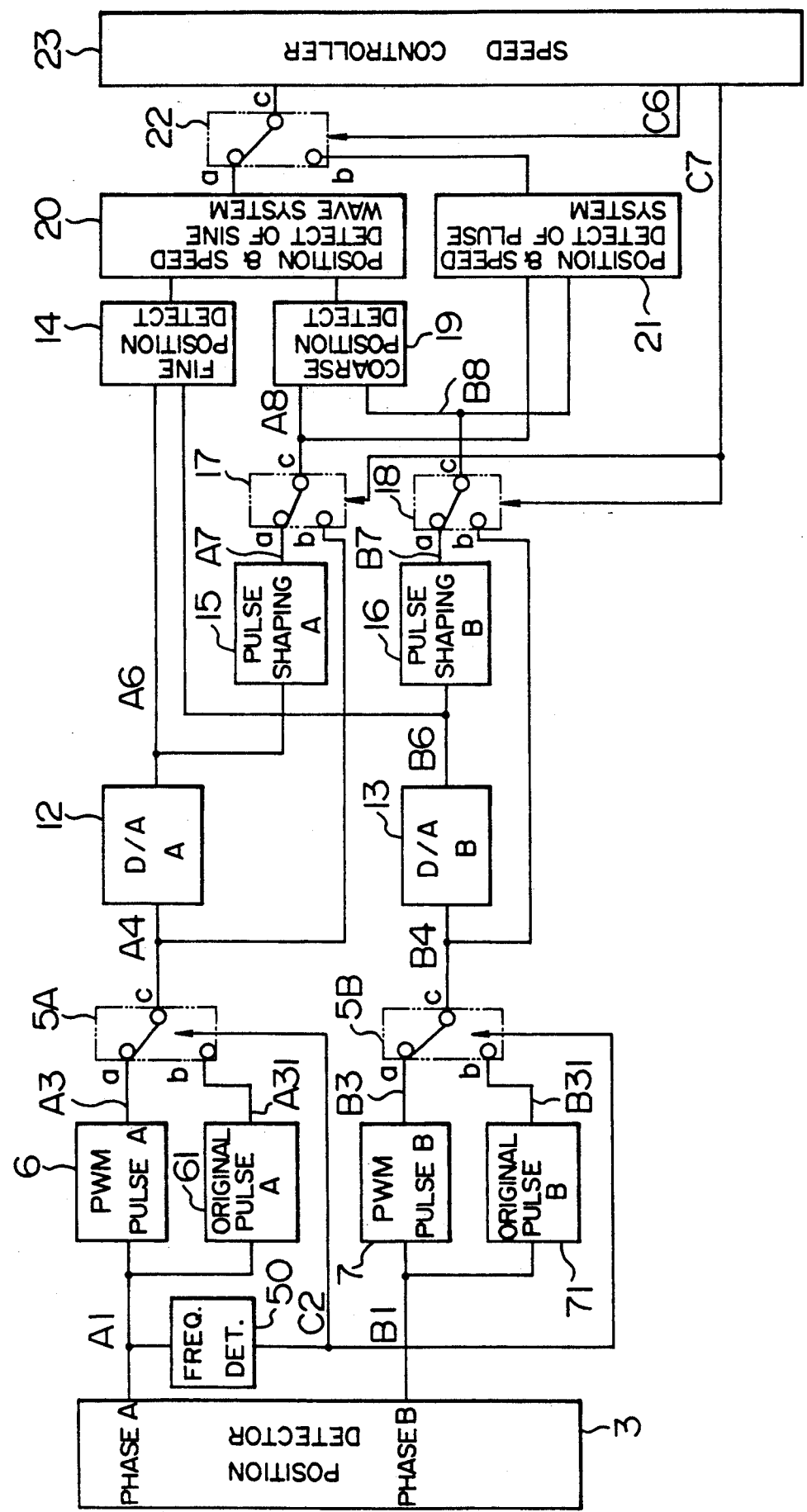
FIG. 2 shows another embodiment.
Figure 8:
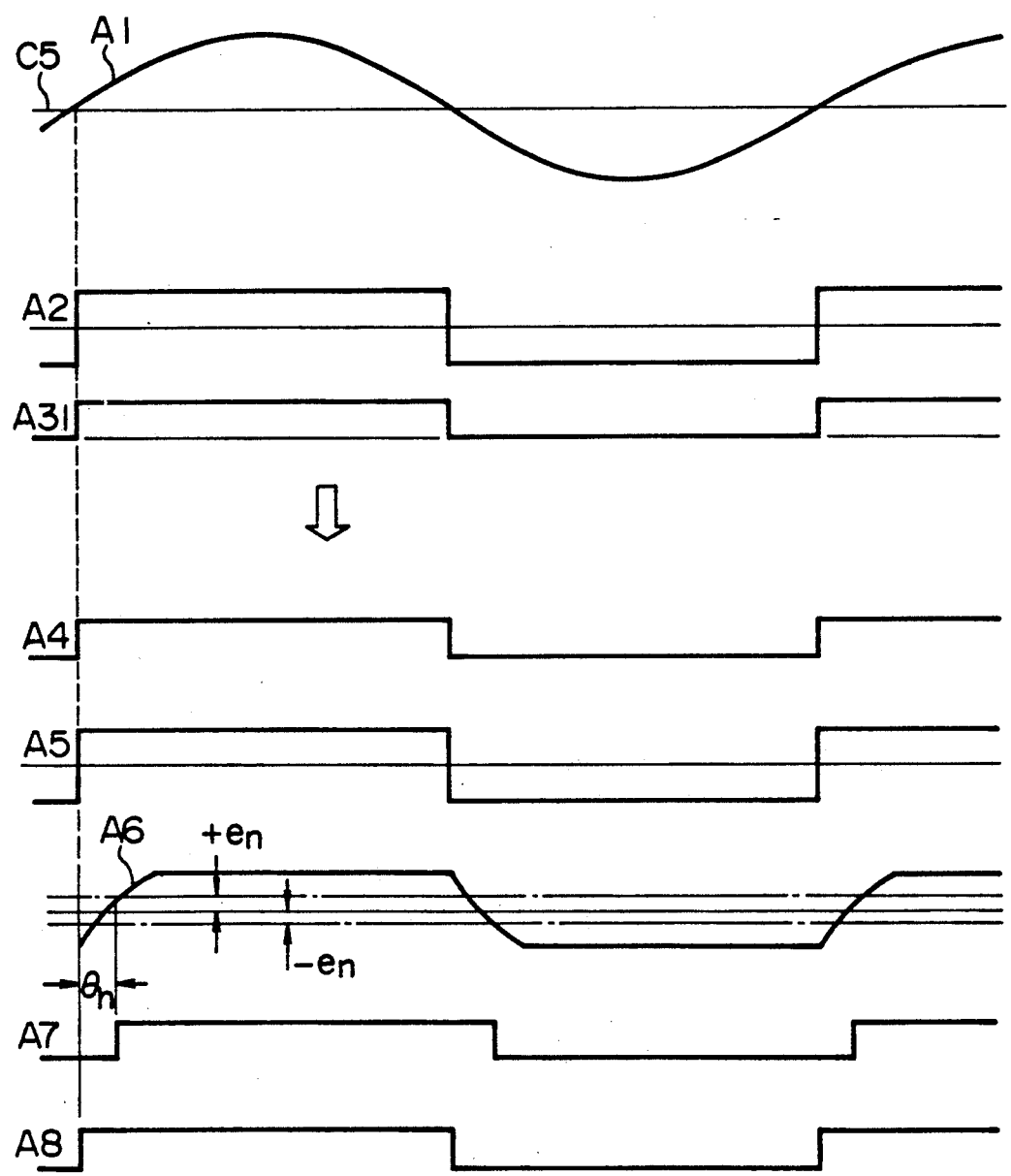
FIG. 8 is a timing chart in pulse transmission at high speed.

FIG. 2 is a block diagram of a further embodiment of the present invention. FIG. 7 is a timing chart for the operation of the particular embodiment performed at low speed and FIG. 8 is a timing chart for the operation of the particular embodiment performed at high speed. A timing chart for B-phase is omitted. The position and speed of the rotating or moving body at low speed can be detected using the system mentioned with reference to FIG. 1. As shown in FIG. 7, when a reproduced sine wave A6 is generated from the PWM output A4, a delay will occur due to the presence of the analog converter 12. The transfer function of the analog converter, represented by $G_A$, is given by the following first-order lag:

$$G_A = 1/(1 + T_A s) \quad (6)$$

where $T_A$ is a delay time constant and s is a complex variable. Thus, as shown in FIG. 7, the reproduced sine wave A6 is delayed by $\theta_a$ in phase from the original signal. When shaped pulses A7 and B7 are formed from the reproduced sine waves in the shaping circuit 15 and 16, the shaped pulses are delayed by $\theta_h$ due to the hysteresis characteristics of the shaping circuits 15 and 16, for example, as shown by A7 in FIG. 7. If the rotating or moving body shifts to high speed region under such condition, the delay of the shaped pulses increases to thereby render difficult the correct detection of position and speed.

As shown in FIGS. 2 and 8, signals A31 and B31 have little delay compared to the position detector outputs A1 and B1 and are generated by original pulse circuits 61 and 71 to detect the position and speed of the rotating or moving body. The PWM pulses A3 and B3 and original pulses A31 and B31 are generated simultaneously from the outputs A1 and B1 from the position detector 3. The frequency is detected from the output A1 of the position detector 3 using a frequency detector 50 to select the contacts of the first switches 5A and 5B. The contacts a of the switches are selected at low speed such that the PWM pulse circuits 6 and 7 are selected and the contact b is selected at high speed such that the original pulse circuits are selected. The contacts a of the second switches 17 and 18 are selected such that the pulse shaping circuits 15 and 16 are selected at low speed while the contacts b are selected at high speed such that original pulse signals with a little delay are selected. The position and speed detector 21 of a pulse system shapes pulses using the rise and fall edges of square pulses A8 and B8 and detects the position and speed in accordance with the equation (1). In the third switch 22, the contact a is selected to select the position and speed detector 20 of a sine wave system or detection of low speed, and the contact b is selected to select the position and speed detector 21 of a pulse system or the detection of high speed. The speed controller 23 provides speed control using a signal from the position and speed detector and generates signals C6 and C7 to select the contacts of the second switches 17, 18 and the third switch 22.

Figure 3:
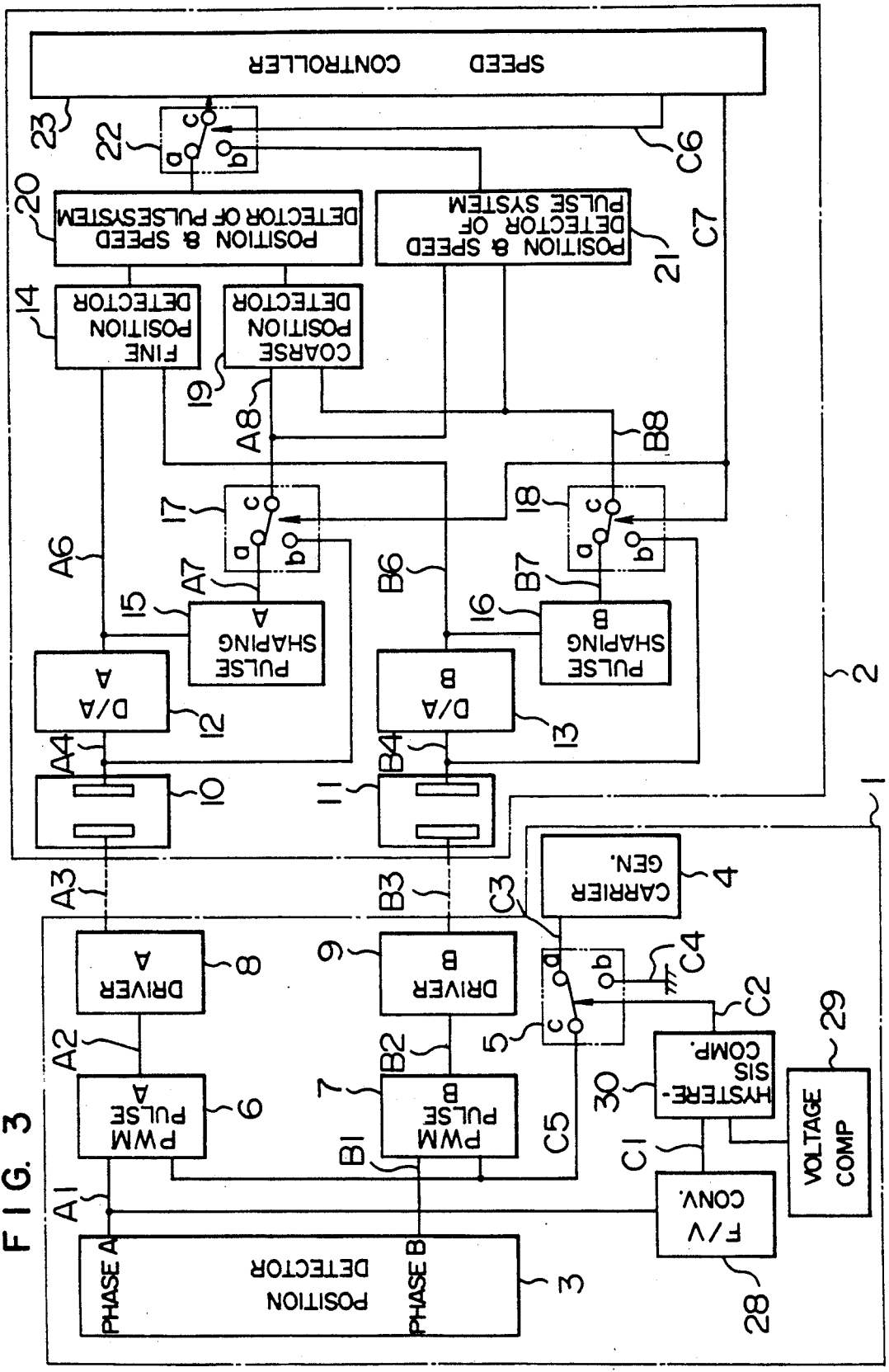
FIG. 3 shows a modification of the embodiment of FIG. 2.
Figure 4:
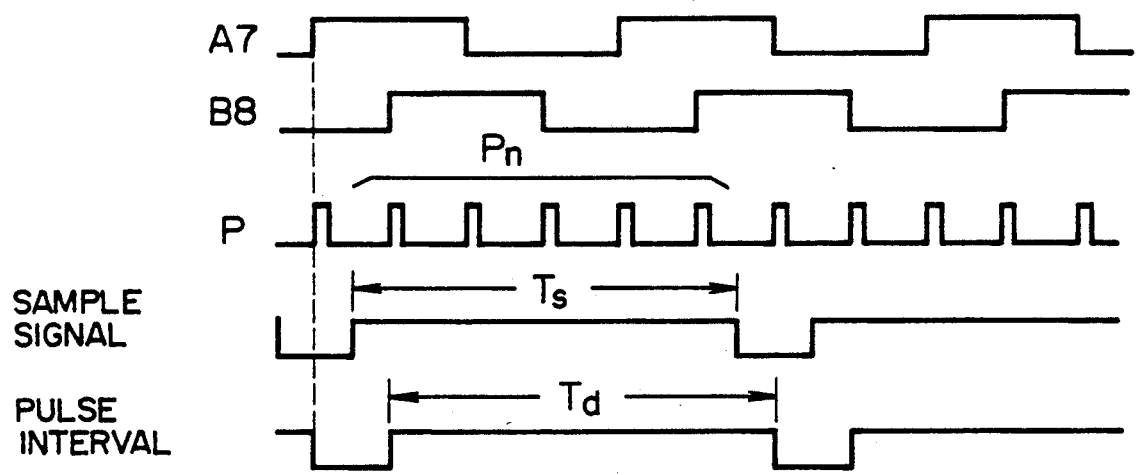
FIG. 4 is a timing chart in the use of a pulse detection system.

FIG. 3 shows a modification of the further embodiment. The same reference numeral is used in FIGS. 1, 2 and 3 throughout. The operation of the apparatus at low speed will be illustrated with reference to FIGS. 3 and 7. Reference numerals 1 and 2 denote encoder-side and control circuit-side block diagrams respectively. At low speed, a triangular signal C3 is generated from a carrier wave generator 4, and the contact a of the first switch 5 is selected to output C5. The PWM pulse forming circuits 6 and 7 compares the outputs A1 and B1 from the sine wave generator 3 and the triangular wave C5 to generate PWM outputs A2 and B2. The PWM outputs A2 and B2 are amplified by the drivers 8 and 9 for long-distance and the outputs A3 and B3 of the drivers are transmitted to the control circuit side 2. In the control circuit side 2, the signals A3 and B3 are received by insulating elements 10 and 11 such as a photocoupler or a pulse transformer, which elements 10 and 11 then output signals A4 and B4, respectively. The signals A4 and B4 are converted by the analog converter 12 and 13 to carriers A5 and B5 of bipolarity, and the resulting signals are supplied as reproduced sine wave signals A6 and B6 via corresponding first-order lag filters (not shown).

The contact b of the first switch 5 is selected at high speed such that the first switch 5 selects a zero voltage C4. At this time, as shown in FIG. 8, the PWM pulse forming circuits 6 and 7 compare the outputs A1 and B1 from the sine wave generator with the zero voltage to provide original square pulses A2 and B2 which are then supplied to the drivers 8 and 9 for long-distance transmission and the outputs A31 and B31 from the drivers are then supplied to the control circuit side 2. In the control circuit side 2, the insulating elements 10 and 11 such as a photocoupler or a pulse transformer receive the signals A31 and B31 and output signals A4 and B4, respectively. The second switches 17 and 18 select their contacts b and hence the signals A4 and B4 and outputs the signals A8 and B8, respectively. The position detector 21 of pulse system receive the signals A8 and B8 and detects the position and speed of the rotating or moving body in accordance with the equation (1), as mentioned above. The third switch 22 selects the contact b to supply the signals from the position and speed detector of pulse system 21 to the speed controller 23, which performs a calculating operation for speed control and generates control signals C7 and C6 for the second and the third switches.

The control signal for the first switch will be described using the block diagram of FIG. 3 and the control diagram of FIG. 9. The output signal A1 from the sine wave generator 3 is delivered to the F/V converter 28 which outputs a signal C1 depending on frequency. The hysteresis comparator 30 generates a signal C2 from the output C1 from the converter 28 and the output from the voltage comparator 29. The signal C2 changes from high to low at a point of $f_3$ when the frequency of the position detector increases. The output C2 from the comparator 30 changes from low to high at a point of $f_2$ when the frequency f decreases. At this time, $f_3 > f_2$. The first switch 5 selects its contact a when the hysteresis comparator 30 generates high output, and outputs as C5 a triangular carrier C3. When the comparator 30 output is low, the switch 5 selects its contact b to output the zero voltage C4. The speed controller 23 calculates the frequency of the position detector 3. When the frequency $f < f_1$, the position and are calculated according to the sine wave system to select the pulse system detector in a range of $f > f_1$.

When the speed of the rotating or moving body increases, the original pulses A4 and B4 are selected when the position detector frequency $f > f_4$ to effect position and speed detection in the pulse detection system. In a frequency range of $f_1 \leq f \leq f_4$, shaped pulses A7 and B7 are selected to effect the position and speed detection in the pulse detection system. While the interval between $f_2$ and $f_3$ is determined by the characteristic of the hysteresis comparator, the interval between $f_2$ and $f_1$, and the interval between $f_3$ and $f_4$ are required to be larger than a range in which the rotating or moving body is subjected to maximum acceleration or maximum deceleration in a single sample time.

Figure 9:
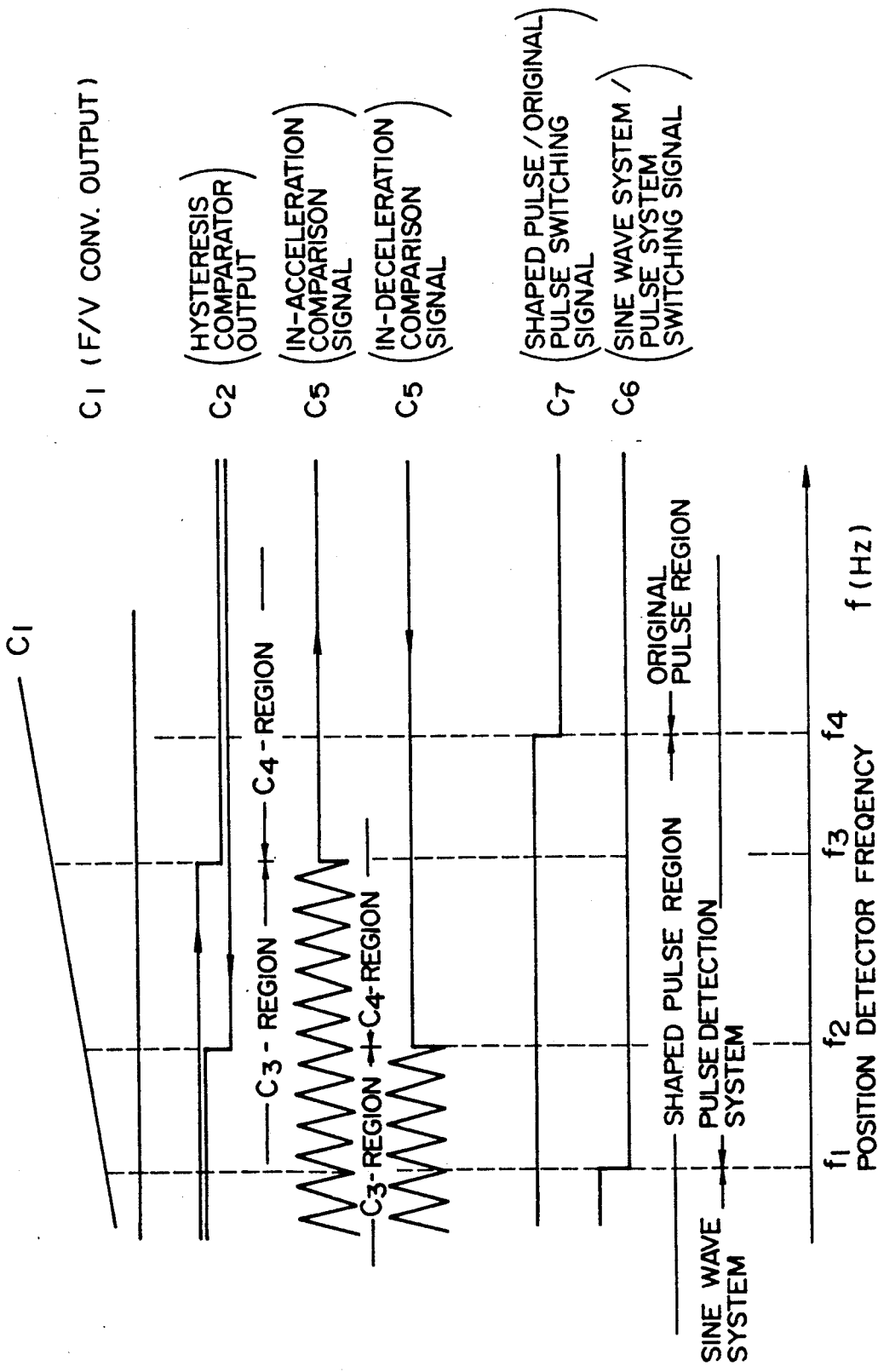
FIG. 9 is an illustration involving respective waveform switching points.

In FIG. 9, an original pulse and a shaped pulse deviate in phase when switching is made between the shaped pulse region and the original pulse region or vice versa. While the original pulse deviates slightly in phase from the sine wave original signal, the shaped pulse is necessarily delayed by a delay $\theta_a$ produced by the corresponding one of the analog converter 12 and 13 and by a hysteresis delay $\theta_h$ produced by the corresponding one of the pulse shaping circuits 15 and 16. While both the delay times are constant, the phase difference increases as the speed increases. The switching point f$_4$ occurs at any time, so that a switching hazard occurs at that time to thereby cause an error in the detection of the position and speed.

Figure 11:
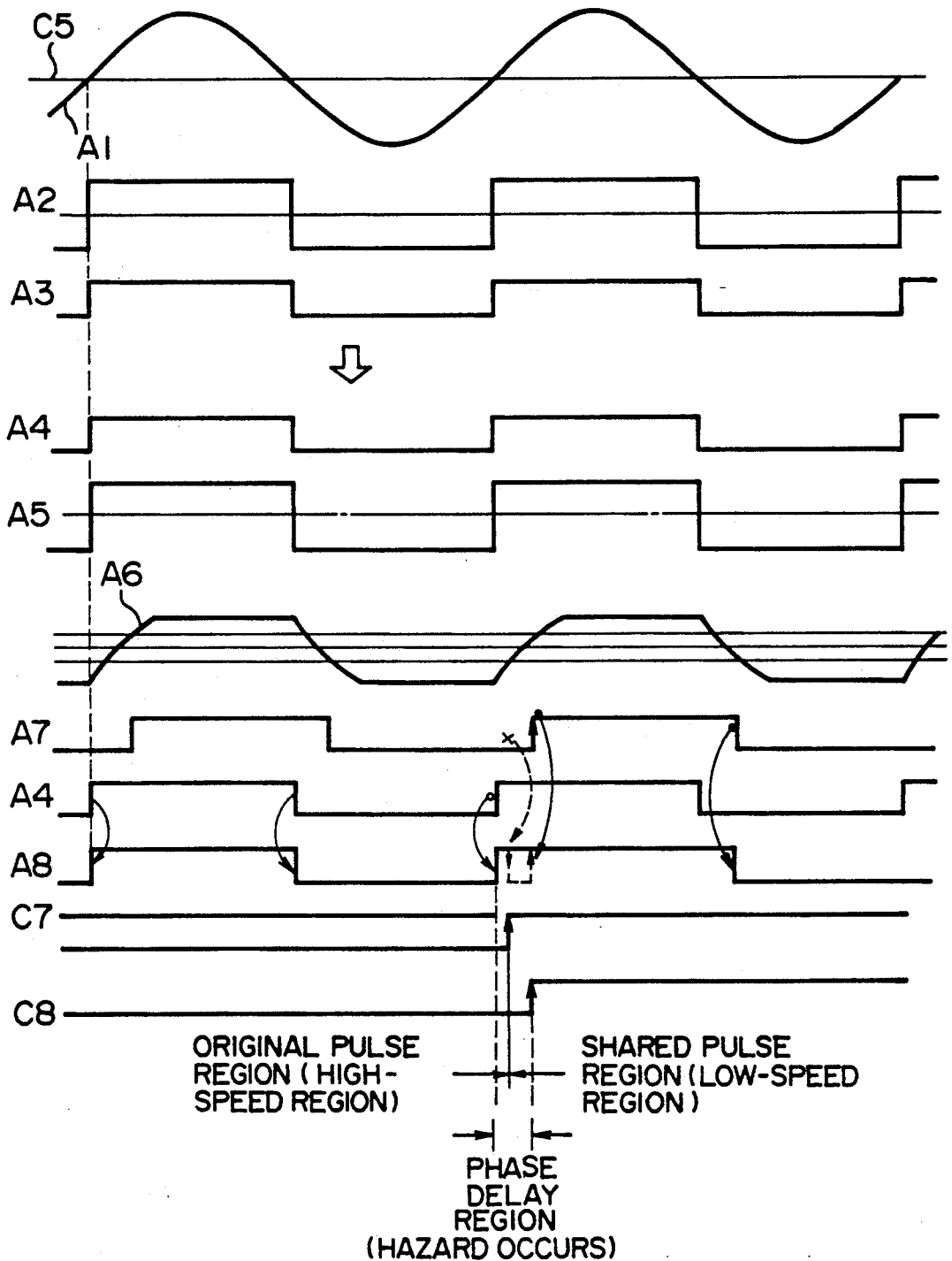
FIG. 11 is a timing chart for switching between a sine wave pulse and an insulating pulse when the speed changes from low to high.

FIG. 10 illustrates the circuit of the switches 17 and 18 which cause no errors. FIG. 11 is a timing chart illustrating the situation in which switching is made from high speed to low speed.

Figure 12:
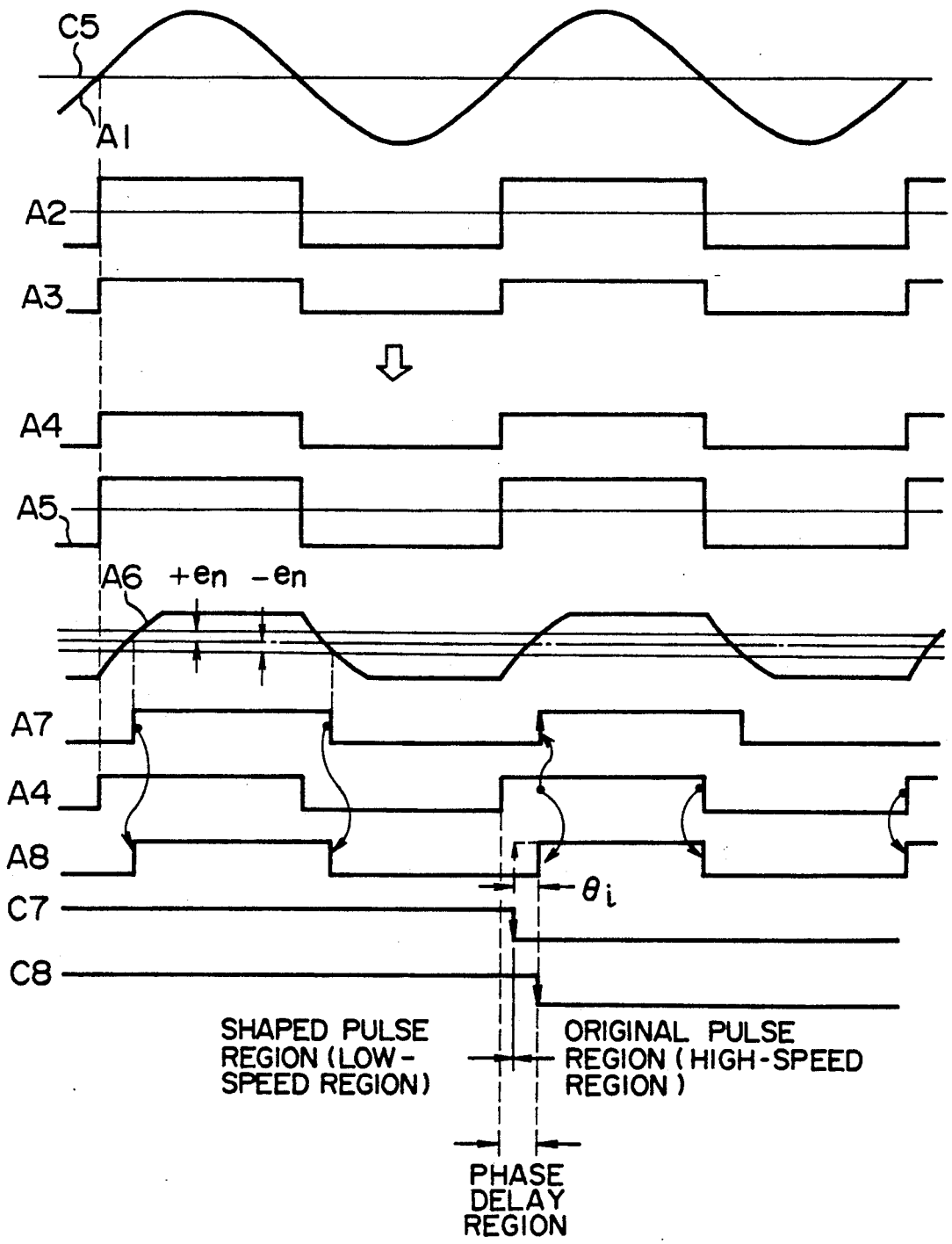
FIG. 12 is a chart indicative of the timing for switching between a sine wave pulse and an insulating pulse when the speed changes from high to low.

FIG. 12 is a timing chart showing the situation in which switching is made from low speed to high speed. The reference characters used in FIGS. 11 and 12 are the same as those described with reference to FIG. 8.

In FIG. 11, the switches 17 and 18 select the original pulses A4 and B4 and output A8 and B8 in the high-speed region. In FIG. 11, assume that a signal C7 from the speed controller 23 to switch from the high speed region to the low speed changes low to high. For example, if the signal C7 changes in the phase delay region, the A8 signal, which has already risen high under the influence of the A4 "O" signal, employs the low A7 "x" signal in response to the signal C7 to thereby cause a hazard as shown by the broken lines. In order to prevent the hazard, the actual switching timing is set at a rise edge of a shaped pulse like the signal C8 after the receipt of the switching signal C7 to switch from the high region to the low region at a point of f$_4$. The embodiment to achieve this object is illustrated in FIG. 10. D-type positive edge flip-flops 31 and 32 are used for switching purposes. Assume that the C7 signal is inputted to a data terminal DA of the flip-flop 31 in the A-phase. Also assume that the transmission signal CKA for data DA is the A7 signal. The output QA is applied to one input of an AND gate 33, and QA to one input of an AND gate 34. An insulating element output pulse A4 is applied to the other input of the AND gate 33 and a sine wave pulse A7 is applied to the other input of the AND gate 34. The QA output signal includes the inverse of the QA signal. The outputs from the AND gates 33 and 34 are inputted to an OR gate 35 which outputs a signal A8. A timing chart for B-phase is similar to that for A-phase, and omitted.

Assume in FIG. 12 that the signal C7 from the speed controller 23 to switch from the low speed region to high speed region changes from high to low. If the signal C7 changes in the phase delay region, the A8 signal changes high earlier by $\theta_i$, but the sine wave pulse A7 is replaced with the insulating element output pulse A4 by the C8 signal in order to prevent a hazard due to switching from high speed to low speed.

In FIGS. 1 and 2, the outputs A1 and B1 from the position detector 3 may be converted by F/V converters to pulse signals, which may be then transmitted, and reproduced by the V/F converter to analog signals for position and speed detection.

Figure 13:
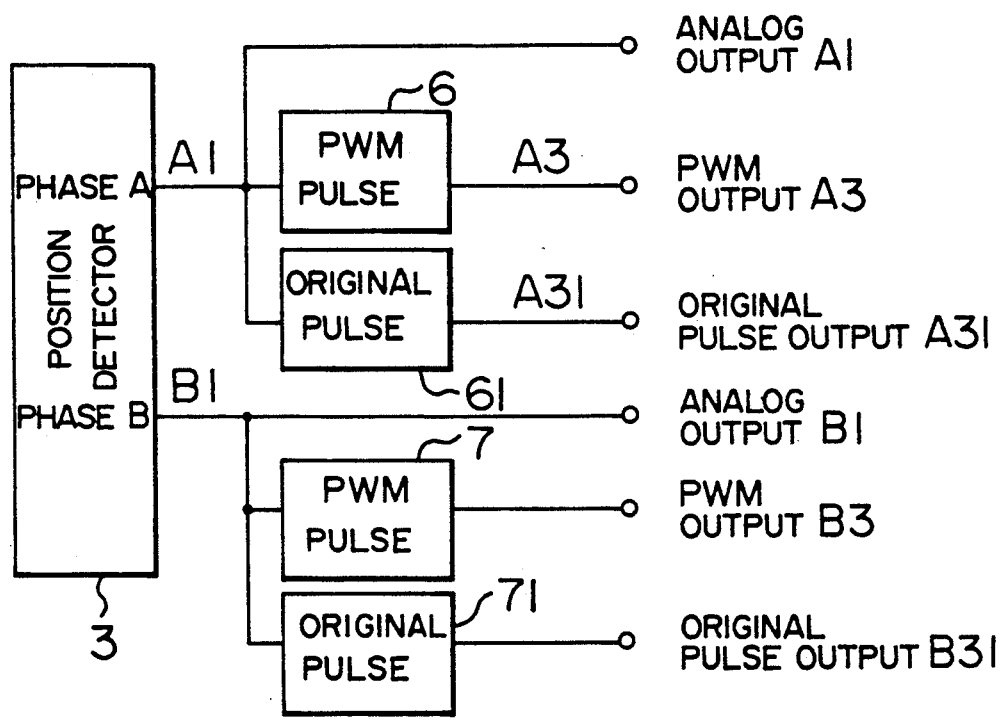
FIG. 13 shows a further embodiment.

FIG. 13 shows another embodiment viewed from the encoder side. The explanation of reference characters used in the timing charts of FIGS. 7 and 8 are the same as those in FIG. 13. The position detector 3 outputs analog signals A1 and B1 in accordance with the movement of the rotating or moving body. PWM pulse forming circuits 6 and 7 compare the analog signals A1 and B1 with a triangular wave or a saw-tooth wave to output signals A3 and B3, respectively. The original pulse circuits 61 and 71 compare the analog signals A1 and B1 with a zero voltage to output square signals A31 and B31, respectively. The encoder is characterized by outputting these signals A1, B1, A3, B3, A31 and B31.

According to the arrangement of the above embodiments, the encoder and the controller are electrically isolated by transmitting a sine wave signal in the form of a PWM signal. This improves the resistance of the controller side to noise and greatly increases the transmission distance between the encoder and controller. The controller side converts the PWM signal to an analog sine wave signal to employ the position and speed detection in a sine wave system to achieve speed control even to an extremely low speed.

In order to avoid a disturbance in the square pulse from the encoder due to time lag provided by the analog converter in the high speed region, a pulse detection system which detects the speed from the number and interval of square original pulses, not delayed, is employed to thereby provide speed control in the speed range of from extremely low speed to high speed.

The encoder side compares a sine wave signal with a triangular signal when the rotating or moving body is at low speed and when a PWM is generated, and compares a sine wave signal with a zero voltage when the rotating or moving body is at high speed to thereby transmit a pulse, which is received with little delay compared to the original sine wave signal by the controller side. Thus, two accurate incremental encoder waveforms 90° out of phase can be obtained even in the high speed region. Continuous switching is possible by providing hysteresis in the selection of one of a triangular wave and a zero voltage when a PWM is generated.

Smooth continuous speed control is achieved by maintaining the relationship $f_1 < f_2 < f_3 < f_4$ where $f_1$ is the switching point between the sine wave system and pulse detection system, $f_2$ is the switching point between a triangular wave and a zero voltage when a PWM is generated in deceleration, $f_3$ is the switching point between a triangular wave and a zero voltage in acceleration, and $f_4$ is the switching point between a shaped pulse and the original pulse.

In switching between a shaped pulse and the original pulse, a hazard may occur and hence an error may be involved in the detected position value when a switching signal is generated in the phase delay region for both the pulses due to delay of the shaped pulse when switching is made from high speed to low speed. In order to prevent this, the second switch is switched by a rise edge of the shaped pulse after the switching signal is received to thereby effect accurate position detection.

As mentioned above, the present invention provides a method of detecting the position or speed, using a position or speed detecting apparatus including a position detector for outputting two analog signals out of phase, means for outputting a signal indicative of a detected fine position from the analog values of the analog signals, and means for converting the analog values to a pulse signal as a signal indicative of a detected coarse position, comprising the steps of: detecting the position or speed of a moving body using the signal indicative of the detected coarse position when the moving body is at high speed; and detecting the position or speed of the moving body using the signal indicative of the detected fine position when the moving body is at low speed.

The specific structure of a position detecting apparatus for realizing this method comprises: a position detector for outputting analog signals such as sine waves or triangular waves out of phase depending on the movement of a rotating or moving body; a pair of PWM pulse forming circuits for performing pulse width modulation on those analog signals from the position detector; a pair of analog converters for converting the PWM pulse signals to analog signals; a pair of pulse shaping circuits for shaping the analog signals to square pulse signals; a coarse position detector for detecting a coarse position of the moving or rotating body from the edges of the pulse signals outputted from the pulse shapeing circuits; and a fine position detector for detecting a fine position of the rotating or moving body from the analog values of the analog signals.

In addition, a pair of photocouplers is disposed in the transmission paths connecting the corresponding PWM pulse forming circuits and the controller side. Therefore, the rotating or moving body can be controlled in a stabilized manner from high speed to low speed, and especially uneven rotation at extremely low speed is eliminated. Further, the frequency characteristic at high speed is improved.

Noise occurring on the side of the position detector (encoder) is completely shut out from the side of the controller, so that a malfunction is reduced. Additionally, since two signals are obtained from a single encoder, the number of components of the position detector is reduced.

We claim:

1. A position detecting apparatus comprising:
    a position detector for generating two analog detection signals, said two analog detection signals being out of phase depending on movement of a rotating or moving body;
    a pair of PWM pulse forming circuits each responsive to an associated one of said analog detection signals for producing a PWM pulse signal having a pulse width representative of positions of said body;
    a pair of D/A converters for converting said PWM pulse signals to reproduced analog signals;
    a pair of original pulse circuits for converting said analog detection signals from said position detector to rectangular wave pulse signals;
    a pair of first switches each connected to receive the PWM pulse signal from an associated one of said PWM pulse forming circuits and the rectangular wave signal from an associated one of said original pulse circuits for selecting one of the PWM pulse signal and the rectangular wave signal to supply the selected signal to an associated one of said D/A converters, the signal selection being such that at least one of the PWM signal and the rectangular wave signal is selected when the moving speed is relatively low and relatively high, respectively;
    a pair of pulse shaping circuits for shaping said reproduced analog signals from said D/A converters to form pulse signals;
    a coarse position detector connected to said pulse shaping circuits for detecting a coarse of said body from edges of the pulse signals from said pulse shaping circuits;
    a fine position detector connected to said pair of D/A converters for detecting a fine position of said body from said reproduced analog signals from said D/A converters; and
    a third switch for selecting one of the outputs from the coarse and fine position detectors depending on the speed of said body.

2. A speed detecting apparatus according to claim 1, wherein said two analog detection signals are 90° out of phase with each other and have a triangular or sinusoidal waveform.

3. A position detecting apparatus comprising:
    a position detector for generating at least one of sine wave and triangular analog detection signals 90° out of phase depending on the speed of a rotating or moving body;
    a pair of PWM pulse forming circuits each responsive to an associated one of said analog detection signals for producing a PWM pulse signal having a pulse width representative of positions of said body;
    a pair of original pulse circuits for generating rectangular wave signals based on said analog detection signals;
    a frequency detector for detecting a frequency of said analog detection signals from said position detector;
    a pair of first switches each connected to receive the PWM pulse signal from an associated one of said PWM pulse forming circuits and the rectangular wave signal from an associated one of said original pulse circuits for selecting one of the received PWM pulse signal and the received rectangular wave signal in response to an output of said frequency detector, the signal selection being such that the PWM pulse signal or the rectangular wave signal is selected when the moving speed of said body is relatively low or relatively high, respectively;
    a pair of D/A converters for converting said selected signals from said first switches to reproduced analog signals;
    a pair of pulse shaping circuits for shaping said reproduced analog signals from said D/A converters to form pulse signals;
    a pair of second switches each connected to receive the reproduced analog signal from an associated one of said D/A converters and the selected signal from an associated one of said first switches for selecting one of the received reproduced analog signal and the received selected signal;
    a coarse position detector connected to receive selected outputs from said second switches and for counting pulses contained in said received outputs from said second switches;
    a fine position detector connected to receive said reproduced analog signal and for producing therefrom fine position information and outputting a signal indicative of said fine position information;
    a position and speed detector of a sine wave system for detecting the position and speed of said body from said output indicative of said fine position information from said fine position detector;
    a position and speed detector of a pulse system for detecting the position and speed of said body from the number of pulses contained in said pulse signals or in said rectangular wave signals and an interval of the pulses;

a third switch connected to receive outputs of said position and speed detector of a sine wave system and said position and speed detector of a pulse system; and a speed controller for providing speed control in accordance with the position and speed of said body, a switching operation of said pair of second switches being controlled by an output of said speed controller, and a switching operation of said third switch being controlled by another output of said speed controller.

4. A speed detecting apparatus according to claim 3, wherein the output of said frequency detector has hysteresis to switch said pair of first switches; and wherein said third switch is controlled to perform a switching operation in a low speed region compared to said pair of first switches, and wherein said pair of second switches is controlled to perform a switching operation in a high speed region compared to said pair of first switches.

5. A speed detecting apparatus according to claim 3, wherein said fine position detector includes a sample-hold circuit for sampling and holding said reproduced analog signals and an A/D converter for converting outputs of said sample-hold circuit to analog signals, and wherein said position and speed detector of a sine wave system includes means for calculating a ratio between said analog signals from said A/D converter and a means for determining a fine position of said body by referencing a position ratio table with said calculated ratio being used as a key to the referencing of said table.

6. A speed detecting apparatus according to claim 3, wherein a signal for selecting one of the original pulse region and the pulse shaping region is switched by edges of said shaped pulse signals.

7. A speed detecting apparatus comprising:

a position detector for generating analog detection signals out of phase depending on movement of a rotating or moving body;

a pair of PWM pulse forming circuits each responsive to an associated one of said analog detection signals for producing a PWM pulse signal having a pulse width representative of positions of said body;

a frequency-to-voltage converter for converting a frequency of at least one of said analog detection signals to a corresponding voltage signal;

a carrier generator for generating a carrier signal;

a first switch connected to receive said carrier signal and a reference potential;

a hysteresis comparator for comparing said voltage signal from said frequency-to-voltage converter with a predetermined voltage to generate a frequency-related hysteresis switch control signal, said control signal being fed to said first switch so that said carrier signal or said reference potential is selected when said voltage signal from said frequency-to-voltage converter is determined to be smaller or larger than said predetermined voltage, respectively, and is supplied to said pair of PWM pulse forming circuits for pulse width modulation with said analog detection signals for producing said PWM pulse signals;

a pair of D/A converters for converting said PWM pulse signals to reproduced analog signals;

a pair of pulse shaping circuits for shaping said reproduced analog signals to form rectangular wave signals;

a coarse position detector connected to said pulse shaping circuits for detecting a coarse position of said body from edges of said rectangular wave signal from said pulse shaping circuits; and a fine position detector connected to said D/A converters for detecting a fine position of said body from said reproduced analog signals from said D/A converters.

a fine position detector connected to said D/A converters for detecting a fine position of said body from said reproduced analog signals from said D/A converters.

* * * * *